United States Patent
Smith et al.

(10) Patent No.: US 10,797,535 B2
(45) Date of Patent: Oct. 6, 2020

(54) Q-FACTOR MEASUREMENT

(71) Applicant: Integrated Device Technology, Inc., San Jose, CA (US)

(72) Inventors: Nicholaus Smith, La Mesa, CA (US); Stefan Maireanu, Milpitas, CA (US); Haiwen Jiang, San Jose, CA (US); David Wilson, Soquel, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 132 days.

(21) Appl. No.: 16/154,665

(22) Filed: Oct. 8, 2018

(65) Prior Publication Data
US 2019/0109499 A1    Apr. 11, 2019

Related U.S. Application Data

(60) Provisional application No. 62/570,034, filed on Oct. 9, 2017.

(51) Int. Cl.
*H02J 50/60* (2016.01)
*H02J 50/70* (2016.01)
*H02M 3/158* (2006.01)
*H02J 50/12* (2016.01)
*H02M 3/156* (2006.01)

(52) U.S. Cl.
CPC .............. *H02J 50/60* (2016.02); *H02J 50/12* (2016.02); *H02J 50/70* (2016.02); *H02M 3/156* (2013.01); *H02M 3/1582* (2013.01)

(58) Field of Classification Search
CPC ..................................................... H02J 50/60
USPC ........................................................ 307/104
See application file for complete search history.

(56) References Cited

U.S. PATENT DOCUMENTS

| | | | |
|---|---|---|---|
| 2009/0279746 A1 | 11/2009 | Clarke et al. | |
| 2013/0134792 A1 | 5/2013 | Bunsen et al. | |
| 2018/0097402 A1* | 4/2018 | Sample | H02J 7/025 |
| 2018/0115197 A1* | 4/2018 | Li | H02J 50/60 |
| 2019/0140489 A1* | 5/2019 | Liu | H02J 50/12 |

OTHER PUBLICATIONS

International Search Report and Written Opinion dated Dec. 14, 2018 issued in parallel PCT Patent App. No. PCT/US2018/055046 (12 pages).

* cited by examiner

*Primary Examiner* — Joseph Chang
(74) *Attorney, Agent, or Firm* — Haynes and Boone, LLP

(57) ABSTRACT

In accordance with some embodiments of the present invention, a method of determining a Q-factor in a transmit circuit with a resonant circuit includes setting a system voltage; performing a coarse scan to determine a course resonant frequency; performing a fine scan based on the course scan to determine a resonant frequency; performing a final measurement at the resonant frequency to determine an average system voltage and an average peak voltage of the resonant circuit; calculating a Q parameter from the average system voltage and the average peak voltage; and calculating the Q-factor from the Q parameter.

24 Claims, 6 Drawing Sheets

Q-FACTOR MEASUREMENT

RELATED APPLICATIONS

The present disclosure claims priority to U.S. Provisional Application 62/570,034, filed on Oct. 9, 2017, entitled "Q-Factor Measurement," which is herein incorporated by reference in its entirety.

TECHNICAL FIELD

Embodiments of the present invention are related to Q-Factor measurement in a transmitter.

DISCUSSION OF RELATED ART

Mobile devices, for example smart phones, tablets, wearable devices and other devices are increasingly using wireless power charging systems that are used to charge battery systems. In many such systems, a Q-factor measurement can be made to detect objects and to assess the efficiency of wireless power transfers.

As discussed above, the Q-factor can be used to detect for an object (foreign or valid Rx unit). The wireless power consortium (WPC) standard recommends to sweep the transmit frequency and measure the peak voltage developed at the LC node formed by the transmit tank circuit (the transmit coil and associated capacitor) and divide by the Bridge DC Voltage in order to arrive at the quality factor.

However, there are several complicating factors in the measurement of the Q-factor in an operating circuit. These include the effects of a variable receiver load, the variable effects of foreign objects, and other effects.

Therefore, there is a need to develop better methods for measuring the Q-factor of a transmit resonant circuit.

SUMMARY

In accordance with some embodiments of the present invention, a method of determining a Q-factor in a transmit circuit with a resonant circuit includes setting a system voltage; performing a coarse scan to determine a course resonant frequency; performing a fine scan based on the course scan to determine a resonant frequency; performing a final measurement at the resonant frequency to determine an average system voltage and an average peak voltage of the resonant circuit; calculating a Q parameter from the average system voltage and the average peak voltage; and calculating the Q-factor from the Q parameter.

In some embodiments, a transmitter that determines a Q-factor according to some embodiments includes a switching bridge circuit; a resonant circuit that includes a transmit coil and a transmit capacitor coupled to the switching bridge circuit; and a controller coupled to the switching bridge circuit to control operation of the resonant circuit and coupled to the resonant circuit to receive a peak voltage from the resonant circuit, wherein the controller executes instructions to set a system voltage, perform a coarse scan to determine a course resonant frequency, perform a fine scan based on the course scan to determine a resonant frequency, perform a final measurement at the resonant frequency to determine an average system voltage and an average peak voltage of the resonant circuit, calculate a Q parameter from the average system voltage and the average peak voltage; and calculate the Q-factor from the Q parameter.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
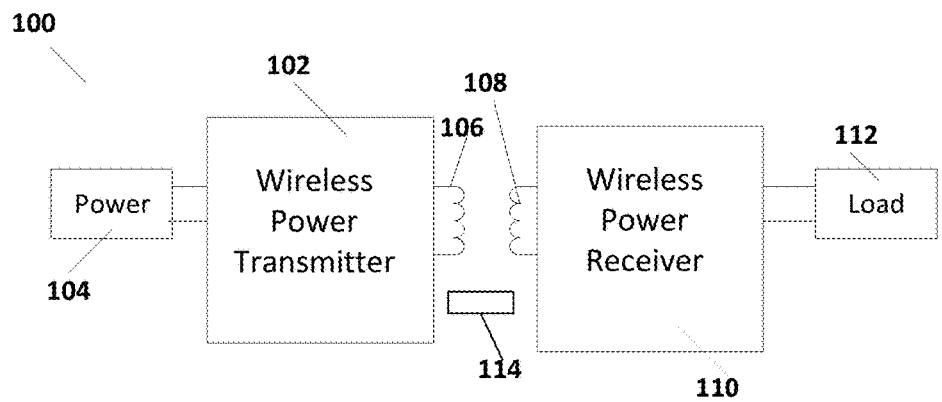
FIG. 1 illustrates a wireless power transmission system

FIG. 1 illustrates a system 100 for wireless transfer of power between a transmitter 102 and a receiver 110. As illustrated in FIG. 1, wireless power transmitter 102 drives a coil 106 to produce a magnetic field. A power supply 104 provides power to wireless power transmitter 102. Power supply 104 can be, for example, a battery based supply or may be powered by alternating current for example 120V at 60 Hz. Wireless power transmitter 102 drives coil 106 at, typically, a range of frequencies according to one of the wireless power standards. However, this could be applicable to any frequency where it is practical to transfer power and/or information by means of magnetic coils irrespective of any standard that may exist.

There are multiple standards for wireless transmission of power, including the Alliance for Wireless Power (A4WP) standard and the Wireless Power Consortium standard, the Qi Standard. Under the A4WP standard, for example, up to 50 watts of power can be inductively transmitted to multiple charging devices in the vicinity of coil 106 at a power transmission frequency of around 6.78 MHz. Under the Wireless Power Consortium (WPC), the Qi specification, a resonant inductive coupling system is utilized to charge a single device at the resonance frequency of the device. In the Qi standard, coil 108 is placed in close proximity with coil 106 while in the A4WP standard, coil 108 is placed near coil 106 along with other coils that belong to other charging devices. FIG. 1 depicts a generalized wireless power system 100 that operates under any of these standards.

As is further illustrated in FIG. 1, the magnetic field produced by coil 106 induces a current in coil 108, which results in power being received in a receiver 110. Receiver 110 receives the power from coil 108 and provides power to a load 112, which may be a battery charger and/or other components of a mobile device. Receiver 110 typically includes rectification to convert the received AC power to DC power for load 112.

The Q-factor of system 100 depends on the properties of the LC resonant circuits of transmitter 102 (with coil 106) and receiver 110 (with coil 108) as well as the dispersive effects of foreign objects 114 that may be in the vicinity of the interaction between wireless power transmitter 102 and wireless power receiver 110. The efficiency of power transfer between wireless power transmitter 102 and wireless power receiver 110 depends on both the Q-factor and operation at or near the resonant frequency. The resonant frequency of system 100 also depends on the interaction between wireless power transmitter 102 and wireless power receiver 110.

Figure 2B:
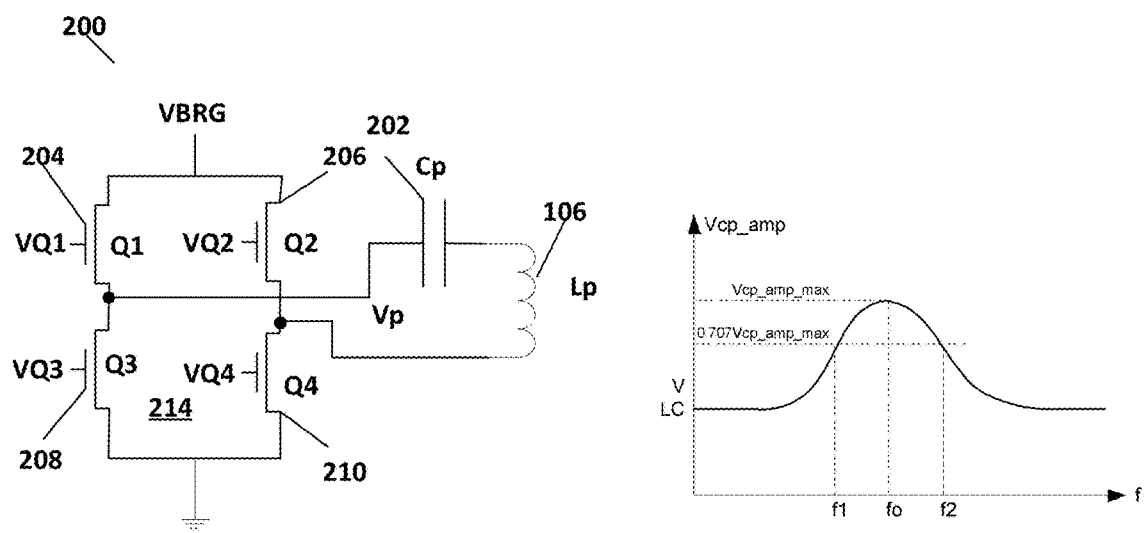
FIG. 2B illustrates a sweep of voltage across a resonant capacitor versus frequency in a transmit LC circuit.
Figure 2A:
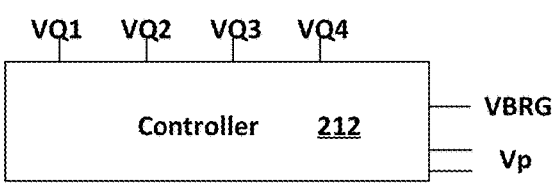
FIG. 2A illustrates a system for measuring the Q-factor according to some embodiments.

FIG. 2A illustrates a transmitter 200 that can be used to execute some embodiments of the present invention. The implementation of transmitter 200 illustrated in FIG. 2A includes a full-wave bridge circuit 214 formed by transistors 204, 206, 208, and 210 coupled to a series coupled capacitor 202 and transmit coil 106. Bridge circuit 214 is coupled between a system voltage VBRG and ground. Controller 212 controls the gates of transistors 204, 206, 208, and 210 to drive current through resonant circuit of capacitor 202 and transmit coil 106 at a particular frequency and current amplitude.

Controller 212 can, for example, include a microcontroller or microprocessor, sufficient memory (both volatile and non-volatile) to store and execute instructions to operate transmitter 200 according to embodiments of the present invention, and supporting circuitry to allow the production of gate voltages VQ1, VQ2, VQ3, and VQ4 to drive bridge 214. In particular, controller 212 can include analog-to-digital converters (ADC) for digitizing the signals received from one or more nodes in the resonant circuit formed by inductor 106 and capacitor 202. Controller 212 can further include filters, amplifiers, and other circuits to handle both the analog-front-end (AFE) functions and the digital functions of controller 212. Controller 212 further controls the transmission of wireless power to wireless power receiver 110 and may further include modulators and demodulators for the transmission and receipt of digital data exchanged with wireless power receiver 110. As is indicated in FIG. 2A, controller 212 receives voltage Vp from a node in the resonant circuit formed by Cp 202 and Lp 106 and also the voltage VBRG.

In some implementations, a half-bridge rectifier circuit formed with transistors Q1 204 and Q3 208 can be formed to drive the LC resonant circuit (formed of inductor Lp 106 and capacitor Cp 202). In some embodiments, bridge circuit 214 may only include transistors Q1 204 and Q3 208, with coil Lp coupled directly to ground. In some embodiments, transistor Q2 206 may be set to off and transistor Q4 210 set on in order to form a half-bridge rectifier from the full-bridge rectifier. Controller 212 may further include a diode and envelope detection circuit that can track the amplitude of the resonant capacitor voltage, Vcp, in order to provide for Q-factor detection. In some embodiments, the voltage VBRG may be provided by a buck circuit that is also controlled by controller 212, or any DC voltage source that provides a stable reference voltage.

FIG. 2B illustrates a curve of the voltage across capacitor Cp 202 as a function of frequency for a typical transmitter circuit, for example transmitter circuit 200. As is illustrated in FIG. 2B, the capacitor voltage (which is indicative of the current through inductor Lp 106) peaks at a resonant frequency $f_0$. The width of the peak is usually depicted at the points $f_1$ and $f_2$, where the voltage Vp is reduced by about 0.707 ($\sqrt{2}/2$) (the 3 dB reduction point).

Previous attempts to measure the Q-Factor has involved sweeping the switching frequency from low frequency (typical about 80 kHz) to high frequency (typical about 120 kHz) in small steps (typical about 100 Hz) steps (or similarly from high frequency to low frequency) in order to find either the maximum voltage amplitude of Vp (at the resonant frequency, fo) and high 3 dB power point, at frequency $f_2$, to calculate the power factor value.

However, measuring the Q-factor within the transmitter in order to get good accuracy in a short time is extremely challenging. In order to measure the Q-factor accurately, the bridge input voltage VBRG must be stable or filtered or FW averaged and known. Additionally, Q-factor determination is typically accomplished while operating at a very small (0.5V or less) bridge voltage. The small bridge voltage is used to avoid activating a nearby receiver 110. This is difficult to create and maintain in practice due to high ripple at light loads and low regulated voltage. The amplitude of the voltage across a capacitor Cp 202 such as that illustrated in FIG. 2A depends on equivalent series resistance in the resonant circuit formed by Lp 106 and Cp 202. These voltages are very difficult to control, in particular when the Q-factor is very high. Further, the sweep step frequency that is often used introduces quantitative measurement error because the sweep frequency may not hit the resonant frequency. Further, the Q-factor detection process may take a relatively long time to finish depending on how many sweeping steps are required to obtain an accurate result.

Figure 3:
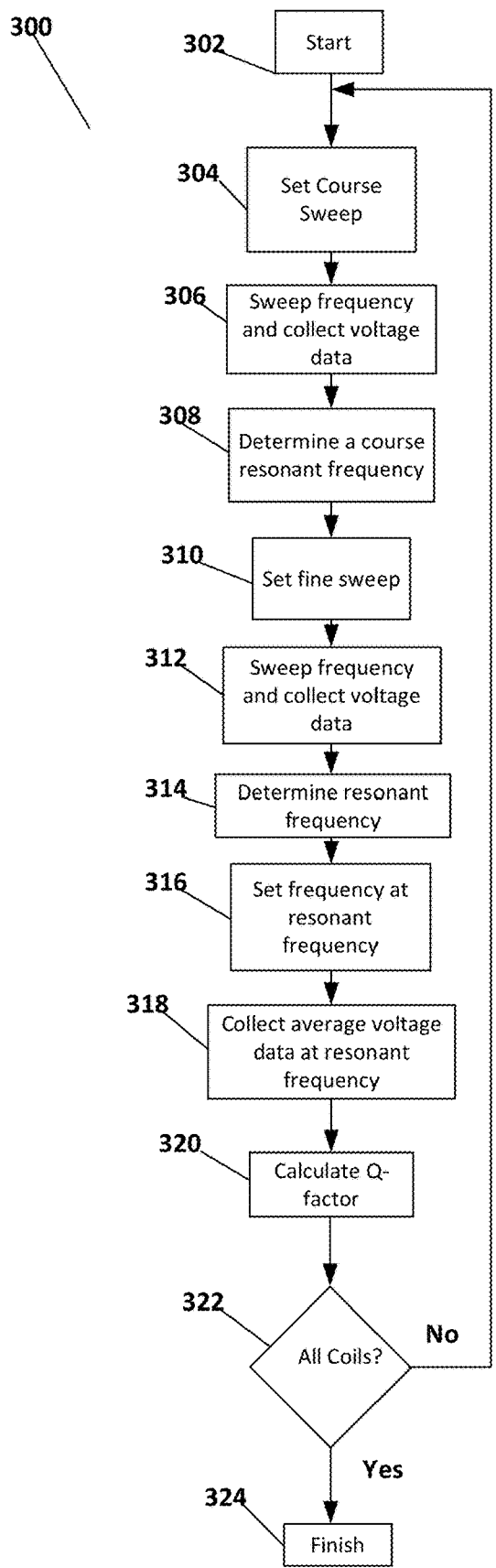
FIG. 3 illustrates a method for measuring the Q-factor according to some embodiments.

FIG. 3 illustrates an algorithm 300 that can be executed in controller 212 for measuring the Q-factor of a transmitter 200 as illustrated in FIG. 2A. As illustrated in FIG. 3, algorithm 300 starts in step 302. In step 302, the voltage VBRG may be set. As discussed above, the voltage VBRG may be set at a low level in order to avoid activating a wireless receiver that may be proximate to transmitter 200. As illustrated in FIG. 3, algorithm 300 includes a Q factor measurement process that completes three sweeps: a Coarse Sweep, a Fine Sweep, and a Final Value Averaging.

As illustrated in FIG. 3, the course sweep starts at step 304 where the course sweep range and step size is set to encompass the resonance frequency. A coarse sweep uses a large frequency step size over a large range (150 kHz down to 75 kHz, for example), which insures that the voltage peak indicating the resonant frequency is found during the sweep. In step 306, controller 202 sweeps through the frequency range with the course step size set in step 304 while collected voltage data for VCP. In some embodiments, the sweep may stop when Vp becomes 0.7*Vp, where Vp is the maximum measured voltage, in order to save time. In step 308, a determination is made of the course resonant frequency based on the data obtained in step 306. The course resonance frequency corresponds to the maximum value of the peak voltage Vp during the course scan of step 306.

In step 310, the fine-scan frequency range and step size is set. The fine-scan frequency range may be set to start at a frequency less than the course resonance frequency corresponding to the peak voltage Vp found in the course sweep and ranges to a frequency greater than the course resonance frequency. For example, the frequency range can be set to a frequency corresponding to a percentage of the course resonance frequency below the course resonance frequency to the percentage about the course resonance frequency. For example, the percentage may be 25% or 10% or some other percentage. At a percentage of 25%, a first frequency is set at the course resonance frequency less 25% of the course resonance frequency and the second frequency is set at the course resonance frequency plus 25% of the course resonance frequency. Other ranges may be set, so long as the range is likely to include the resonant frequency $f_0$. Further, the fine sweep step size for the fine-scan frequency range is also set.

In step 312, the fine sweep is performed using the fine-scan frequency range and the step size determination set in step 310 while the peak voltage data Vp is monitored. In step 314, the resonant frequency is determined by determining the frequency resulting in the maximum of the peak voltage data Vp. The resonant frequency, accordingly, is determined within the resolution of the frequency step size set in step 310 and may be refined by fitting the voltage data measured during the peak to a curve depicting the typical resonant curve such as that illustrated in FIG. 2B.

In step 316, which starts the final average process of the procedure, the frequency is set to the resonant frequency determined in step 314, $f_0$. In step 318, controller 202 operates the tank circuit at the resonance frequency $f_0$ and takes averages of the peak voltage Vp and the system voltage VBRG, which may be determined by a buck voltage regulator. Some objects are found to shift the resonance frequency substantially and in some cases the peak voltage may be missed.

In step 320, an ADC scaling factor can be applied to the value of the averages of Vp and VBRG, as is discussed further below. The ADC scaling factor depends on the analog-to-digital converter (ADC) that is part of controller 202 and processing circuitry that provides voltage indicative of the peak voltage Vp to the ADC.

The Q-factor can be determined from a parameter (a Q parameter) Q'=Vp/VBRG, which is calculated based on the corrected average peak voltage Vp and the average VBRG values determined in step 318. After that, a $2^{nd}$ order polynomial equation of the parameter or a multi-piece (e.g. 2-5 piece) linear curve fit equation can be used to determine the Q-factor. The $2^{nd}$ order polynomial or the piece-wise linear curve fitting equations can be determined by curve fitting data to expected values that are measured under the same conditions with an LCR precision meter.

If a $2^{nd}$ order polynomial equation is to be used, the relationship between the value of Q found with the LCR precision meter and the value Q' found by the above measurement procedure can be given by the polynomial $Q=A(Q')^2+B(Q')+C$. The values of A, B, and C are determined by testing and curve-fitting using an LCR precision meter with transmitter 200. In particular, the value of Q' is measured while the LCR precision meter is used to determine the Q-factor and the coefficients A, B, and C of the above polynomial is then determined for each implementation of transmitter 200. In one such example, A=85.5, B=−461 and C=651.6. These coefficients may vary significantly between different transmitters, depending on the components of transmitter 200. In some cases, an account for variation in Vp due to low duty cycle SWx and other system losses may also be made.

If a multi-piece linear curve fit equation is to be sued, there are two variables for each of the lines used in the fit. For example, in a 2-piece linear fit, the linear curve fit models to variables A, B and C, D to build two curves that fit the data and intersect at a valid point, which may be designated Q'_BRK and the corresponding valid Q-factor value. For example, in some coils at Q'=2.4 and Q-factor=80. The selection of coefficients A, B or C, D are decided based on which part of the curve fit equation Q' initial value lands within before applying the curve fit equations. An example of the coil-dependent equations for the linear curve-fit equations can be given by:

If $Q'>Q'\_BRK[coil\ \#]$, then $Q\_temp[coil\#]=A[coil\#]*(Q'+Q'\_Offset[coil\#])+B[coil\#]$, and If $Q'\leq Q'\_BRK[coil\#]$, then $Q\_temp[coil\#]=C[coil\#]*(Q'+Q'\_Offset[coil\#])+D[coil\#]$, where A, B, C, D, and Q'_BRK are the coefficients discussed above and Q'_Offset represents an offset parameter. These parameters can be programmable for tuning purposes and are further used to account for variation in Q' due to board-to-board differences in the LC tank drive conditions and other resistive system differences.

Additionally, due to the high quality factor of the transmitter LC tanks and the temperature dependence of copper resistance, in some embodiments it is necessary to compensate the Q-factor results from these fittings (polynomial or piecewise-linear) for transmit coil temperature changes based on the result of the Q-temp calculation and the current coil temperature. In some implementations, controller 212 (e.g., the IDT P9261 controller) allows for different ranges of Q_temp results to be scaled differently based on the result of Q-temp. This is necessary because the change in copper resistance due to temperature changes the Q-result by around 0.18 (Q-points/° C.) (for low Q-temp result (such as US Nickel). The final Q-factor result can be calculating using the following equation:

$Q\text{Factor}=Q\_temp[coil\#]+Q\text{tempco}[Q\_temp[coil\#]]*$
(Coil_Temperature−25° C.), where Qtempco represents the temperature coefficient.

As discussed above, once the polynomial values or linear coefficients for a multi-piece linear-fitting for the polynomial are set for a particular circuit, the Q-factor can be found by determining Q' and using the polynomial to find Q. Such a procedure saves time by running quick scans with low averages to get the approximate resonance frequency, hone in on the resonance frequency using a semi-successive approximation technique. Such a procedure detects very closely the resonant frequency. The only error is frequency setpoint error, for example due to a 60 MHz master clock and 16-bit DAC. These procedures are fairly simple and straight forward to operate.

In step 322, algorithm 300 determines if all of the coils in transmitter 200 have been evaluated. If not, then algorithm 300 returns to step 304 to determine the Q-factor of the next coil. If all coils have been evaluated, then algorithm 300 proceeds to step 324 where controller 212 can then, for example, use the determined Q-factor to determine presence of a foreign object.

Figure 4:
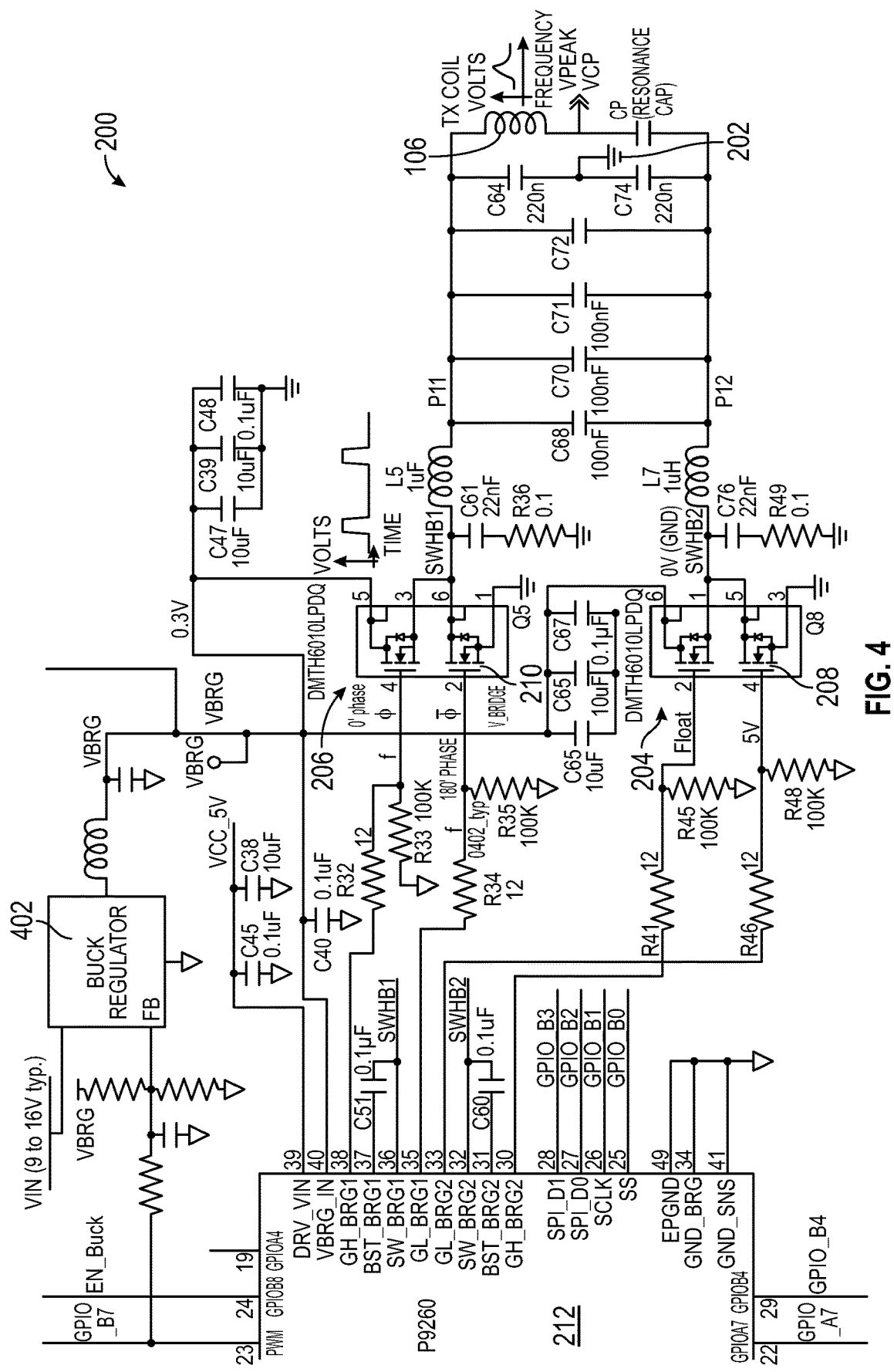
FIG. 4 illustrates further detailed implementation of the system illustrated in FIG. 2A.

FIG. 4 illustrates application of an embodiment of the present invention where controller 212 is a wireless power transmitter chip, for example the IDT P9260 IC. As discussed above, controller 212 executes algorithm 300 as discussed with FIG. 3. In this example, the voltage VBRG, which is produced by buck regulator 402, can be set to a low voltage, for example 0.3V (+/−10%). A large number of data points (for example 100 or more) of VBRG can be taken at the determined resonant frequency to account for ripple due to light load and low voltages.

In the example illustrated in FIG. 4, transistor 204 is set off while transistor 208 is turned on. Transistors 206 and 210 are operated at a frequency f with 180° phase shift between the gates of transistors 206 and 210. As is further illustrated in FIG. 4 the half-bridge formed by transistors 206 and 210 can be operated at a particular duty cycle. The duty cycle can be any appropriate duty cycle. In some embodiments, the duty cycle is kept below 50%, for example a 5% duty cycle. As described in algorithm 300 illustrated in FIG. 3, the resonance frequency and measure average values of Vp and VBRG are determined at the resonance frequency. As is further discussed above, the quality factor Q is determined. The phases, driving voltage, and resulting voltage across inductor 106 are illustrated in FIG. 4.

Figure 5:
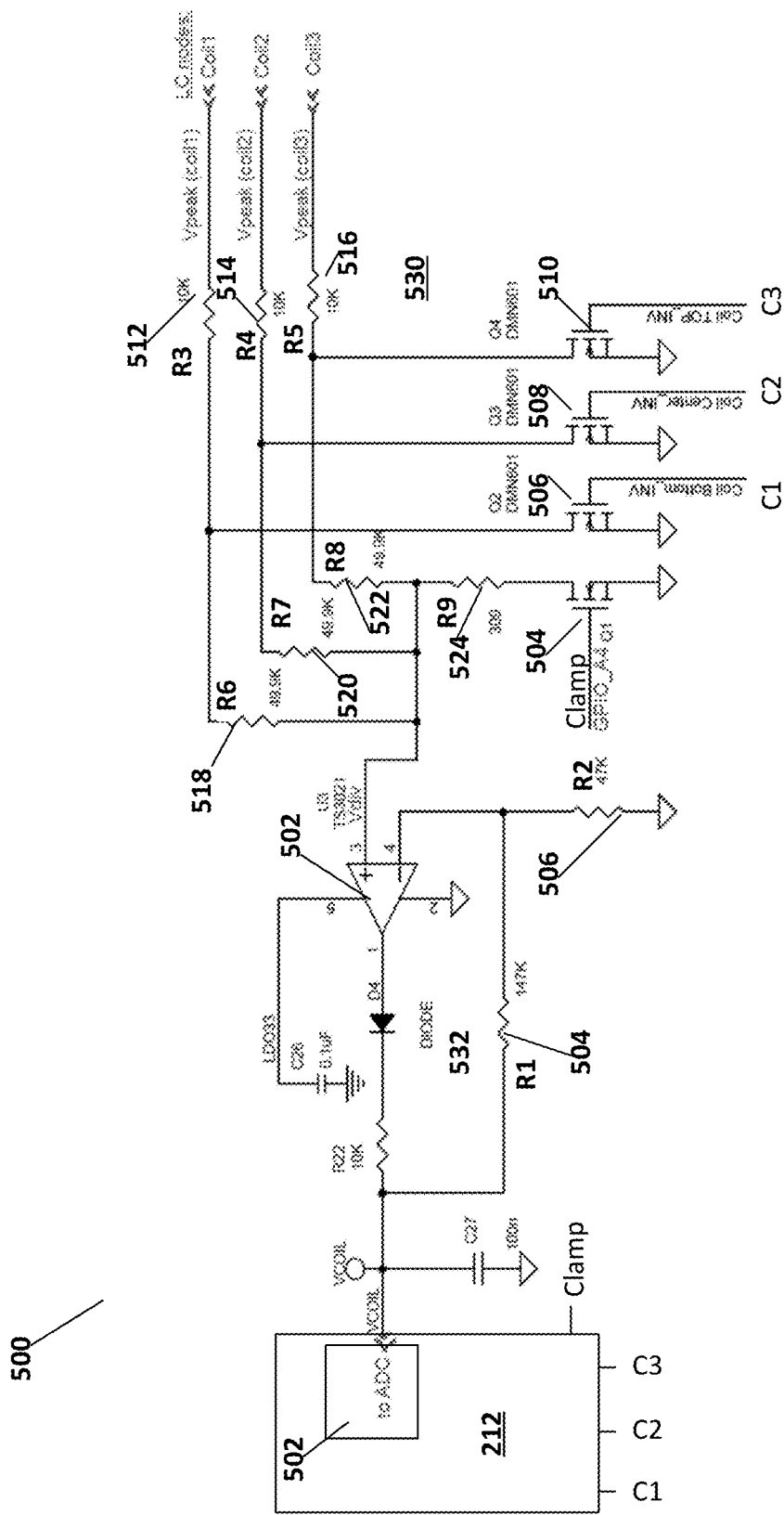
FIG. 5 illustrates a system for providing Q-factor determination of multiple coils.

FIG. 5 illustrates a circuit 500 for providing a scaling factor to relate VCOIL to Vp (Vpeak) and to select input from multiple coils, of which coil 1, coil 2, and coil 3 are illustrated here. As such, circuit 500 includes a select circuit 530 and a scale circuit 532. Between select circuit 530 and scale circuit 532, the voltage Vp from one of the coils is read and scaled for input to an ADC 502 of controller 212.

As discussed above, select circuit 530 selects the voltage Vp from one of the coils coupled to select circuit 530. As discussed above, the voltage Vp may be the voltage across the capacitor in the resonant circuit or the voltage across the transmit coil in the resonant circuit and is used as described above to calculate Q'. As illustrated in FIG. 5, controller 212 provides control signal Clamp as well as signals C1, C2, and C3. The signal Clamp can turn on transistor 504 while signals C1, C2, and C3 can be used activate transistors 506, 508, and 510. As such, signals C1, C2, and C3 can be set to select the Vp input voltage from one of coil 1, coil 2, or coil 3 that are coupled to circuit 500. The voltage Vp from coil 1 can be selected by setting signals C1, C2, and C3 to turn transistor 506 off and transistors 508 and 510 on. Similarly, the voltage Vp for Coil 2 can be selected by turning transistors 506 and 510 on and transistor 508 off and the voltage Vp for Coil 3 can be selected by turning transistors 506 and 508 on and 510 off.

Select circuit 530 provides a voltage Vdiv from voltage Vp through a voltage divider. When coil 1 is selected by signals C1, C2, and C3, a voltage divider formed by resistors R3 512, R6 518, and R9 524 determine the voltage Vdiv into scale circuit 532 as Vdiv=Vp(R9/(R3+R6+R9)). Similarly, when coil 2 is selected a voltage divider is formed by resistors R4 514, R7 520, and R9 524, which provides the voltage Vdiv into scale circuit 532 given by Vdiv=Vp(R9/(R4+R7+R9)). When coil 3 is selected a voltage divider is formed by resistors R5 516, R8 522, and R9 524, which provides the voltage Vdiv into scale circuit 532 given by Vdiv=Vp(R9/(R5+R8+R9)). Although any set of resistor values can be used, in one example with R3=R4=R5=10K Ω, R6=R7=R8=49.9K Ω, and R9=24.95K Ω, then Vdiv=0.294 Vp.

As is illustrated in FIG. 5, the voltage Vdiv, which is a divided voltage from voltage Vp, is input to differential amplifier 502 of scale circuit 532. Differential amplifier 502 is configured with resistor R1 532 and R2 506 to provide an output voltage VCOIL given by VCOIL=Vdiv (1+R1/R2). Although any combination of resistors R1 532 and R2 506 can be provided, a particular example can have R1=147K and R2=47K so that VCOIL=4.127 Vdiv=1.213 Vp. During the Q factor measurement VCOIL, which is the input to ADC 502, is 1.213 times larger than Vp from the node of the LC circuit. Then the Q-factor is calculated based on data of VBRG and Vpeak and executing the pre-determined algorithm as discussed above with respect to algorithm 300. This example illustrates the division and multiplication that can manipulate the voltage signal of interest to maintain compliance with valid voltage levels for the components and measurement system and are provided is not intended to limit the scope of this disclosure in any way. Other manipulations may be used with embodiments.

Figure 6:
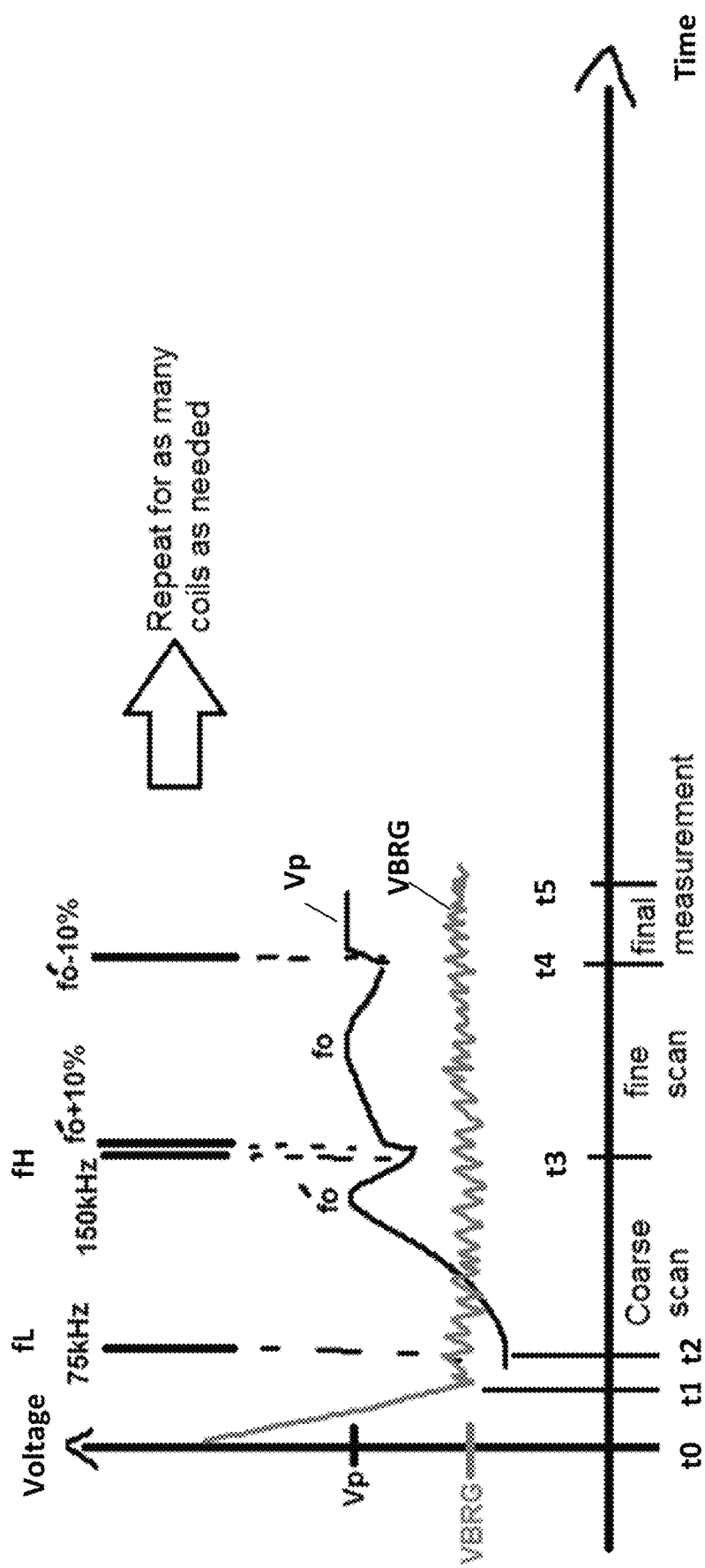
FIG. 6 illustrates the scans as a function of time.

FIG. 6 illustrates an implementation of algorithm 300 as illustrated in FIG. 3. In particular, FIG. 6 illustrates the voltages Vp and VBRG as a function of time while algorithm 300 is being implemented. As illustrated in FIG. 6, at time t0 to time t1, during start step 302, VBRG is set and allowed to settle. Further, step 304 is executed to set the low frequency fl and high frequency fH range. At time t1, step 306 is executed and the course scan begins. In the particular example illustrated in FIG. 6, fl is set to 75 kHz and fh is set to 160 kHz. In some embodiments, the course scan is accomplished with 100 steps and may finish when the voltage Vp is reduced by some percentage (e.g., 30% or so) from the peak value of Vp measured. The course scan finishes at time t3.

At time t3, step 308 is executed to determine the course resonance frequency $f_0'$ based on the peak of the measured voltage Vp. Further, step 310 is executed to determine the range of frequencies based on the course resonance frequency $f_0'$ to perform the fine scan. In some embodiments, the fine scan ranges some percentage around $f_0'$, for example $f_0'-10\%$ $f_0'$ to $f_0'+10\%$ $f_0'$. The sweep can be in a positive frequency direction or a negative frequency direction. Consequently, at roughly time t3 the fine sweep beings and the fine sweep ends at time t4, during which time step 312 is executed to acquire data on voltage Vp. At time t4, step 314 is executed to determine the resonant frequency $f_0$ from the fine scan data.

During the time period between t4 and t5, the final measurement is taken where the frequency is set at $f_0$. In some cases, the duty cycle of the switching circuitry can be set to a particular value. In general, the duty cycle should be set at a value less than 50%, for example 5%. During the time period between t4 and t5, values of Vp and VBRG are taken in order to obtain average values. Several data points are taken, for example 30 or more, in order to arrive at an accurate average.

Figures 7A, 7B, 7C:
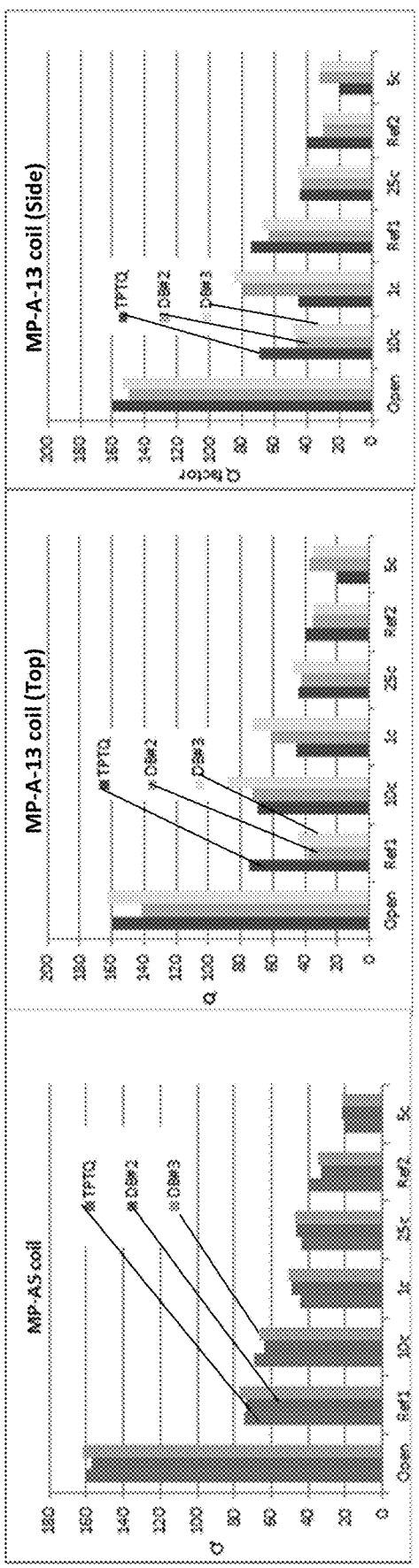
FIGS. 7A, 7B, and 7C illustrate calculations of the Q-factor with several different coils under particular conditions.

FIGS. 7A, 7B, and 7C illustrate the results of several Q-factor determinations according to some embodiments of the present invention. FIG. 7A illustrates a system using an MP-A5 coil, FIG. 7B illustrates results using a Delphi coil, top, and FIG. 7C illustrates results using an MP-A13 coil, bottom. In each of the graphs, Q-factors are determined using on open configurations, a 1 c coin, a 5 c coin, a 10 c coin, a 25 c coin, and two reference objects labeled Ref1 and Ref2. TPTQ, DB#2, and DB#3 refer to the WPC certified tester, where Nok9 reference coils are used for certification. Ref1 and Ref 2 refer to WPC standard metal objects used to reduce the coil Q value by ½ and ¼, respectively. The metal objects are placed centered directly above the coil under test.

After running the scans, three variables are known: VBRG, VCOIL, and the resonant frequency (with or without a foreign object). To convert these variables to the Qfactor, first Q'=VCOIL/(1.213*VBRG) (when switched at the resonant frequency) and finally $Q=A(Q')^2+B(Q')+C$, or the results of the multi-section linear fitting is used. The charts in FIG. 6 illustrate the Q from various objects (coils, WPC Qfactor reference objects taken from a calibrated precision LCR meter and the P9260 IC chip).

Consequently, embodiments can operate in a circuit that energizes an LC tank at variable frequencies, including the resonance frequency, and can include a detection circuit that can determine the peak voltage Vp at the Tx LC node, and a process that can calculate the Q factor based on the parameters measured from the circuit. Algorithm 300, executed by transmitter 200, frequency scans the circuit to accurately detect the resonance frequency and provides a model that relates Vp measured and VBRG measured at the resonant frequency to the quality factor of the system using square waves switched at less than 50% duty cycle. The method can tune systems quickly in the field or the lab.

The above detailed description is provided to illustrate specific embodiments of the present invention and is not intended to be limiting. Numerous variations and modifications within the scope of the present invention are possible. The present invention is set forth in the following claims.

What is claimed is:

1. A method of determining a Q-factor in a transmit circuit with a resonant circuit, comprising:
    setting a system voltage;
    performing a coarse scan to determine a coarse resonant frequency;
        performing a fine scan based on the coarse scan to determine a resonant frequency;
        performing a final measurement at the resonant frequency to determine an average system voltage and an average peak voltage of the resonant circuit;
        calculating a Q parameter from the average system voltage and the average peak voltage; and
        calculating the Q-factor from the Q parameter.

2. The method of claim 1, wherein setting the system voltage includes adjusting a buck voltage converter to produce the system voltage.

3. The method of claim 1, wherein the system voltage is set at a low enough voltage that a receiver in the proximity of the transmit circuit will not be activated.

4. The method of claim 1, wherein performing a coarse scan comprises:
    setting a coarse frequency range and a coarse step size;
    sweeping a frequency through the frequency range at the coarse step size while monitoring a peak voltage of the resonant circuit; and
    determining the coarse resonant frequency wherein the peak voltage is at a maximum.

5. The method of claim 1, wherein performing a fine scan comprises:
    setting a fine frequency range based on the coarse resonant frequency;
    setting a fine step size based on the fine frequency range;
    sweeping a frequency through the fine frequency range at the fine step size while monitoring a peak voltage of the resonant circuit; and
    determining the resonant frequency where the peak voltage is at a maximum.

6. The method of claim 5, wherein the fine frequency range is set from a percentage of the coarse resonant frequency less than the coarse resonant frequency to the percentage of the coarse resonant frequency higher than the coarse resonant frequency.

7. The method of claim 6, wherein the percentage is 25%.

8. The method of claim 6, wherein the percentage is 10%.

9. The method of claim 1, wherein performing a final measurement comprises:
    setting a frequency at the resonant frequency;
    setting a duty cycle;
    measuring the average system voltage VBRG and the average peak voltage at the frequency and the duty cycle.

10. The method of claim 1, wherein calculating the Q parameter as the ratio of the average peak voltage to the average system voltage.

11. The method of claim 10, wherein the average peak voltage is adjusted according to an ADC parameter.

12. The method of claim 1, wherein calculating the Q-factor from a $2^{nd}$ order polynomial or linear piece-wise equation fitting to the Q parameter.

13. A transmitter that determines a Q-factor, comprises:
    a switching bridge circuit;
    a resonant circuit that includes a transmit coil and a transmit capacitor coupled to the switching bridge circuit; and
    a controller coupled to the switching bridge circuit to control operation of the resonant circuit and coupled to the resonant circuit to receive a peak voltage from the resonant circuit, wherein the controller executes instructions to set a system voltage,
    perform a coarse scan to determine a coarse resonant frequency,
    perform a fine scan based on the coarse scan to determine a resonant frequency,
    perform a final measurement at the resonant frequency to determine an average system voltage and an average peak voltage of the resonant circuit,
    calculate a Q parameter from the average system voltage and the average peak voltage, and
    calculate the Q-factor from the Q parameter.

14. The transmitter of claim 13, further including a buck voltage converter to provide the system voltage and wherein the controller sets the system voltage by adjusting the buck voltage converter.

15. The transmitter of claim 14, wherein the system voltage is set at a low enough voltage that a receiver in the proximity of the transmit circuit will not be activated.

16. The transmitter of claim 13, wherein the controller performs a coarse scan by
    setting a coarse frequency range and a coarse step size;
    sweeping a frequency through the frequency range at the coarse step size while monitoring a peak voltage of the resonant circuit; and
    determining the coarse resonant frequency wherein the peak voltage is at a maximum.

17. The transmitter of claim 13, wherein the controller performs a fine scan by
    setting a fine frequency range based on the coarse resonant frequency;
    setting a fine step size based on the fine frequency range;
    sweeping a frequency through the fine frequency range at the fine step size while monitoring a peak voltage of the resonant circuit; and
    determining the resonant frequency where the peak voltage is at a maximum.

18. The transmitter of claim 17, wherein the fine frequency range is set from a percentage of the coarse resonant frequency less than the coarse resonant frequency to the percentage of the coarse resonant frequency higher than the coarse resonant frequency.

19. The transmitter of claim 18, wherein the percentage is 25%.

20. The transmitter of claim 18, wherein the percentage is 10%.

21. The transmitter of claim 13, wherein the controller performs a final measurement by
- setting a frequency at the resonant frequency;
- setting a duty cycle;
- measuring the average system voltage VBRG and the average peak voltage at the frequency and the duty cycle.

22. The transmitter of claim 13, wherein the controller calculates the Q parameter as the ratio of the average peak voltage to the average system voltage.

23. The transmitter of claim 22, further including
- a select circuit that provides a divided voltage from the peak voltage, and
- a scale circuit that receives the divided voltage and provides a coil voltage to an analog-to-digital converter of the controller,
- wherein the average peak voltage is adjusted according to an ADC parameter.

24. The transmitter of claim 23, wherein the controller calculates the Q-factor from a $2^{nd}$ order polynomial or linear piece-wise equation fitting to the Q parameter.

* * * * *